United States Patent [19]

Beckley et al.

[11] Patent Number: 4,665,427

[45] Date of Patent: May 12, 1987

[54] METHOD AND APPARATUS FOR CONVERTING C-MAC TELEVISION SIGNALS FOR TRANSMISSION OVER A LIMITED BANDWIDTH MEDIUM

[75] Inventors: John C. Beckley, Banstead; Peter R. Brennand, London; Bruce Murray, Surrey, all of Great Britain

[73] Assignee: U.S. Philips Corporation, New York, N.Y.

[21] Appl. No.: 585,705

[22] Filed: Mar. 2, 1984

[30] Foreign Application Priority Data

Mar. 14, 1983 [GB] United Kingdom ................. 8306921
May 25, 1983 [GB] United Kingdom ................. 8314434

[51] Int. Cl.⁴ ........................ H04N 11/00; H04N 7/06
[52] U.S. Cl. ........................................ 358/11; 358/12; 358/143; 358/13
[58] Field of Search ..................... 358/11, 13, 12, 141, 358/142, 143, 146, 198, 147; 370/109; 375/122; 381/34

[56] References Cited

U.S. PATENT DOCUMENTS

| | | | |
|---|---|---|---|
| 3,781,463 | 12/1973 | Van den Bussche | 358/12 |
| 3,789,137 | 1/1974 | Newell | 358/143 X |
| 4,245,235 | 1/1981 | Poetsch | 358/14 |
| 4,335,393 | 6/1982 | Pearson | 358/12 |
| 4,476,484 | 10/1984 | Haskell | 358/11 |
| 4,544,950 | 10/1985 | Tu | 358/143 |

FOREIGN PATENT DOCUMENTS

0142902 5/1985 European Pat. Off. ............. 358/12

OTHER PUBLICATIONS

Herold, "A Compatible High-Resolution TV System for Cable Casting", Proceedings of the IEEE, vol. 36, No. 7, Jul. 1970.

K. Lucas and M. D. Windram, *Direct Television Broadcasts by Satellite–Desirability of a New Transmission Standard*, IBA Report 116/81, pp. 1–19.

*Primary Examiner*—John W. Shepperd
*Attorney, Agent, or Firm*—Thomas A. Briody; Jack Oisher; William J. Streeter

[57] ABSTRACT

A wide-band frequency modulated DBS signal of the type having time sequential compressed chrominance and luminance (video) components is received by an aerial (1), frequency converted in a down converter (2) and applied to the input (4) of a conversion unit. The conversion unit has a tuner (5), i.f. stage (9,10) and a frequency demodulator (11) to produce baseband video which is applied after de-emphasis at (12) to a modulator (27) where the video is amplitude modulate onto a vision carrier from an oscillator (28). The modulated carrier is applied through a vestigial sideband filter (29) and an adder (30) to an output (31). Sound/data bursts present in the DBS signal are recovered in a stage (13) and processed in a processor (14) where the sound/data bursts are expanded to occupy approximately a line period at a bit rate which is an integral sub-multiple of the bit rate for the sound/data bursts in the received DBS signal. The expanded sound/data and clock frequency are digitally modulated in a modulator (32) onto a sound carrier from an oscillator (33), the modulated sound carrier being applied through a bandpass filter (34) and the adder (30) to the output (31). The output (31) is connected to a cable distribution system for which the narrow band signals produced by the conversion unit are suited as such systems cannot cope with high bit-rates. The processing of the sound/data bursts such that their bit rate is substantially reduced also simplifies the handling and demodulation processes for these bursts.

14 Claims, 12 Drawing Figures

METHOD AND APPARATUS FOR CONVERTING C-MAC TELEVISION SIGNALS FOR TRANSMISSION OVER A LIMITED BANDWIDTH MEDIUM

BACKGROUND OF THE INVENTION

The invention relates to a method of processing the digital sound/data components of a time multiplexed television signal, discrete lines of which sequentially contain a digital sound/data component at a first bit rate and a vision component. The invention also relates to apparatus using the above method and a television transmission system and an associated conversion unit and a receiver which use the above method.

Following the decision in March 1982 that direct broadcast by satellite (DBS) of television programs for the United Kingdom would commence in 1982, an Advisory Panel chaired by Sir Anthony Part was established to report on technical transmission standards. The findings of this Panel, published in November, 1982 by Her Majesty's Stationery Office as Cmnd 8751 "Direct Broadcasting by Satellite —Report of the Advisory panel on Technical Transmission Standards" (known as the Part Report), recommended that the Independent Broadcast Authority's Multiplexed Analogue Component (C-MAC) system should be adopted for DBS, which recommendation has subsequently been accepted.

Figure 1:
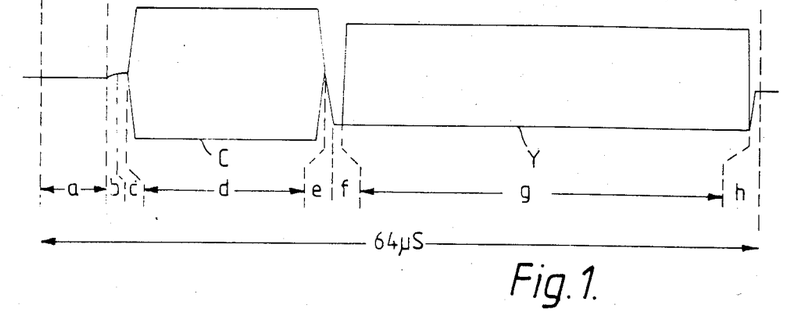
FIG. 1 shows, diagrammatically, one line period of a C-MAC television signal.

The C-MAC system has been described in the Independent Broadcast Authority's Experimental and Development Report 118/82 "MAC—A Television System for High-Quality Satellite Broadcasting" dated August, 1982, this report also describing the A-MAC system (the prefix relating to the type of sound and data transmission). Proposed specifications were included in this report for the two systems, that for the C-MAC system having been revised since the adoption of that system for DBS. The changes in the structure of the video waveform have been a reduction in transition periods following the sound/data, chrominance and luminance (vision) components with a consequent lengthening of the sound/data component FIG. 1 of the accompanying drawings (which is not to scale) diagrammatically shows one line period of a C-MAC television signal, derived from a draft specification for the system, which occupies 64 µs and each line is divided nominally into a number of bit or sample periods at a clock rate of 20.25 MHz, there being 1296 such samples per line. Each line contains the following in the sequence given:

a=194 bits—synchronization, sound/data
b=4 samples—transition from end of data
c=15 samples—main clamp period (zero-level of chrominance reference)
d=355 samples—chrominance (C)
e=4 samples—grey-to-black transition
f=10 samples—black level clamp period (block level reference
g=710 samples—luminance (Y)
h=4 samples—transition into data.

The chrominance component is time compressed at a rate of 3:1 so that 52.59 µs of chrominance information is compressed to occupy 17.53 µs (355 samples) with the R-Y color difference signal being transmitted on alternate lines and the B-Y color difference signal being transmitted on the intervening lines. The luminance component is time compressed at a rate of 3:2 so that 52.59 µs of luminance information is compressed to occupy 35.06 µs (710 samples). For DBS transmissions, the compressed chrominance and luminance components are frequency modulated with a bandwith of 27 MHz while the radio frequency carrier is modulated using 2-4 phase shift keying (2-4 PSK) by the digital sound/data component. The exact nature of the sound/data component has not yet been decided but examples are given in the above mentioned documents.

The above specification has been further revised in the European Broadcasting Union Draft New Report "Television Standards for 625-line 12 GHz Satellite Broadcasting", SPB 284, dated June, 1983, and each line contains the following in the sequence given;

a=203 bits—synchronization, sound/data (data burst).
b=4 samples—transition from end of data.
c=15 samples—main clamp period (zero-level of chrominance reference).
SC1=6 samples—reserved for vision scrambling.
d=354 samples—chrominance (C).
g=704 samples—luminance (Y).
SC2=6 samples—reserved for vision scrambling.
h=4 samples—transition into data.

From this EBU Draft Standard it will be seen that the components e and f have been omitted while component SC1 has been inserted between components c and d and component SC2 has been inserted between components g and h. In addition, the chrominance component amplitude has been changed to make it the same as the luminance component. However, these changes are not important for an understanding of the invention.

While it will be possible for houshods to directly receive the DBS transmission by means of a dish aerial of appropriate size sighted onto the satellite with a down-converter at the aerial to bring the frequency of the incoming transmission to just above the broadcast U.H.F. bands, it has also been suggested that many households will prefer to receive such transmission via a cable television distribution system which, at the same time, can convey other television programs while doing away with the need for individual aerials. Such distribution by way of cable will obviously have advantages where the signal from the satellite is weak, e.g. the transmission is not primarily intended for the country in which it is received, and where transmissions are being received from a number of satellites located in different geostationary positions thus requiring a complex aerial array.

Chapter 7 of the Part Report deals with the interaction between DBS and cable distribution systems and it is reported that the Cable Television Association of Great Britain believe that they would be able to provide a cable service even if C-MAC was chosen as the DBS transmission standard. Several examples are given in that chapter and, where appropriate to C-MAC, the inference is that this type of signal could be directly transmitted over cable systems. Present cable transmission systems use co-axial cable conveying their television programs in the V.H.F. broadcast bands and while there is much debate at present as to whether future installed systems should use optical fiber cables, it is quite likely that many of the systems yet to be installed will also be co-axial cable in view of lower installation cost.

It has recently been realized that the transmission of a C-MAC signal over a VHF cable transmission system is not as feasible as originally throught as the 27 MHz bandwidth of such a signal would occupy too much bandwidth thus reducing the number of programs that such a cable system could carry. In addition transmission of the sound/data component at the high 20.25 Mbit/s rate would pose severe problems on such cable systems because of the short delay reflections produced and that there is a much lower bit rate limit for such cable systems. With the above in mind, some sources have suggested that the only practical way of handling such a signal over a VHF cable transmission system is to convert the C-MAC signal into a PA1 type signal prior to its application to a cable system. Such a conversion would lose the advantage of time multiplexed chrominance and luminance and re-introduce the defects of cross-luminance and cross-color present with color subcarrier systems, but, more important where the received DBS signal is scrambled to prevent unauthorized reception e.g. subscription television services, it would be necessary to descramble the signal prior to conversion and then rescramble the converted signal.

In addition, it has also been realized that the high bit rate of the digital sound/data component (20.25M bits/s) would make it difficult to process even in television receivers which will receive their transmissions directly from a satellite.

SUMMARY OF THE INVENTION

It is an object of the invention to provide a method of processing such sound/data components and a television system in which the above respective difficulties can be overcome.

The invention provides a method of processing the digital sound/data components of a time multiplexed television signal, discrete lines of which sequentially contain a digital sound/data component at a first bit rate and a vision component, characterized in that said digital sound/data components are separated from said television signal and expanded to have a second bit rate, each expanded digital sound/data component occupying the major part of a discrete period which period corresponds to the period of a line, said second bit rate being an integral sub-multiple of said first bit rate, the second bit rate being greater than $f_1 \times (n/m)$, where $f_1$ is the first bit rate, n is the number of bits in the compressed sound/data component in said television signal, and m is the number of bits in a line period at said first bit rate.

Reducing the bit rate of the sound/data component from a first bit rate (which may be 20.25M bits/s) to a much lower second bit rate simplifies the handling and circuitry requirements for organizing and demodulating the sound/data components.

The invention additionally provides a television transmission system in which a first time-multiplexed television signal having a given bandwidth is converted into a second television signal for transmission via a media with a bandwidth which is restricted with respect to that of the first television signal, in which discrete lines of said first television signal sequentially contain a digital sound/data component, a time compressed chrominance component and a time compressed luminance compound, said digital sound/data component modulating a carrier at a first bit rate while said carrier is frequency modulated by said chrominance and luminance components, characterized in that said second television signal comprises a first carrier amplitude modulated by a video signal, discrete lines of which sequentially contain the time compressed chrominance component and the time compressed luminance component at corresponding compression rates and located in corresponding positions as with said first television signal, said second television signal further comprising a second carrier located outside the modulation bandwidth of said first carrier which second carrier is modulated by the digital sound/data component at a second bit rate, discrete periods of which, corresponding to the period of a line, contain the sound/data component present in the discrete lines of said first television signal but expanded to occupy the major part of each discrete period, said second bit rate being an integral sub-multiple of said first bit rate, the second bit rate being greater than $f_1 \times (n/m)$, where $f_1$ is the first bit rate, n is the number of bits in the compressed sound/data component in said first television signal, and m is the number of bits in a line period at said first bit rate.

In such a system, by changing the modulation of the chrominance and luminance components from frequency to amplitude modulation (which is preferably vestigial sideband) an immediate saving in bandwidth is obtained without substantially any loss in signal quality. Any scrambling of these components can be retained and there is no need, as with the previously mentioned proposal, to de-scramble and then rescramble these components. In addition, by retaining the compression rates and positions of the chrominance and luminance components of the frequency modulated signal in the amplitude modulated signal, it is possible to use correspondingly the same decoding techniques, and hence components (in particular) integrated circuits), in a television receiver for connection to a cable distribution system as for a receiver for the direct reception of DBS signals. By expanding the sound/data component, the bit rate is reduced which overcomes the problem of short delay reflections in co-axial cable systems, and choosing this bit rate as the integral sub-multiple of the first bit rate makes it relatively simple to produce this second bit rate on conversion and to reproduce the first bit rate at the receiver. This first bit rate will be required at the receiver for synchronizing purposes. The choice for the second bit rate means that additional bits should be added to the expanded sound/data.

In such a system, the modulation of the first carrier by the video signal may be vestigial sideband amplitude modulation and the second carrier may be located on the vestigial side of the modulated first carrier. For ease of sychronization in a receiver, a pulse signal may be additionally present in each line of the vision signal of the second television signal, which pulse signal would be located within the position corresponding to that of the data/sound component in the first television signal.

In the above method or system, the integral sub-multiple for the second bit rate may be one-fifth or less than one-fifth, and in a particular embodiment, is one-sixth of the first bit rate.

Additional digital components may be added to the expanded sound/data component during the minor part of each discrete period, which additional digital components may convey additional sound/data information.

The invention further provides apparatus for use with the above method, comprising means for receiving a television signal, discrete lines of which sequentially contain a digital sound/data component at a first bit rate and a vision component, and means for recovering the digital sound/data component from said television signal, characterized in that said apparatus additionally comprises means for expanding the recovered sound/data component at a second bit rate such that the recovered component from each line of said first television signal occupies a major part of a discrete period which corresponds to the period of a television line, the second bit rate, being an integral sub-multiple of the first bit rate which second bit rate is greater than $f_1 \times (n/m)$, where $f_1$ is the first bit rate, n is the number of bits in the sound/data component in said first television signal, and m is the number of bits in a line period at the first bit rate.

The invention also provides a conversion unit for use with the above television transmission system and which comprises means for receiving said first television signal, discrete lines of which sequentially contain a digital sound/data component, a time compressed chrominance component and a time compressed luminance component, with said digital sound/data component modulating a carrier at a first bit rate while the carrier is frequency modulated by said compressed chrominance and luminance components, means for frequency demodulating said modulated carrier to produce said compressed chrominance and luminance components and means for recovering the digital sound/data component from said modulated carrier, characterized in that said conversion unit additionally comprises means for amplitude modulating the demodulated compressed chrominance and luminance components onto a first carrier in such manner that the compression rates and positions of said components correspond to those in said first television signal, means for expanding the recovered sound/data component at a second bit rate such that the recovered component from each line of said first television signal occupies a major part of a discrete period which corresponds to the period of a television line, the second bit rate being an integral sub-multiple of the first bit rate which second bit rate is greater than $f_1 \times (n/m)$, where $f_1$ is the first bit rate, n is the number of bits in the sound/data component in said first television signal, and m is the number of bits in a line period at the first bit rate, means for modulating the expanded sound/data component on a second carrier located outside the modulation bandwidth of the first carrier, the first and second modulated carriers forming the second television signal.

Such a unit may additionally comprise a vestigial sideband filter so that the first carrier is vestigial sideband amplitude modulated by said compressed chrominance and luminance components and means may also be provided for positioning the second carrier on the vestigial side of said first carrier. The conversion unit may further comprise means for generating a pulse signal at the line rate, and means for adding this pulse signal to the vision signal of the second television signal in such manner that the pulse signal is located within the position corresponding to that of the sound/data component in the first television signal.

The above apparatus or conversion unit may additionally comprise means for adding digital components to the expanded digital sound/data component during a minor part of each discrete period and may also further comprise means for modulating the added digital components with sound/data information.

The invention yet further provides a television receiver for use with the above television system which comprises selection means connected to a restricted bandwidth transmission media for selecting one from a number of transmission channels, a first signal processing arrangement connected to said selection means for processing the video signal conveyed by said first carrier, characterized in that said receiver additionally comprises a second processing arrangement for processing the sound/data information conveyed by said second carrier, said second processing arrangement including means for recovering a clocking signal corresponding to that of the first carrier and means for driving the first bit rate present in said first television signal from the second bit rate present in said second television signal.

In such a receiver, means may be provided for producing timing signals for the processing of the chrominance and luminance components, which timing signals are produced from information contained in the sound/data component, the pulse signal in the video signal then being recovered which is applied to the processing means to ensure a given time relationship between the pulse signal and the timing signals. This pulse signal may also be used to provide automatic gain control in the receiver.

The receiver may also be a dual standard receiver to receive either the second television signal or a frequency multiplexed television signal. A number of processing stages in the receiver may then be common to both signals.

DESCRIPTION OF THE DRAWINGS

The above and other features of the invention will now described by way of example with reference to the accompanying drawings, in which.

DESCRIPTION OF THE PREFERRED EMBODIMENT

Figure 2:
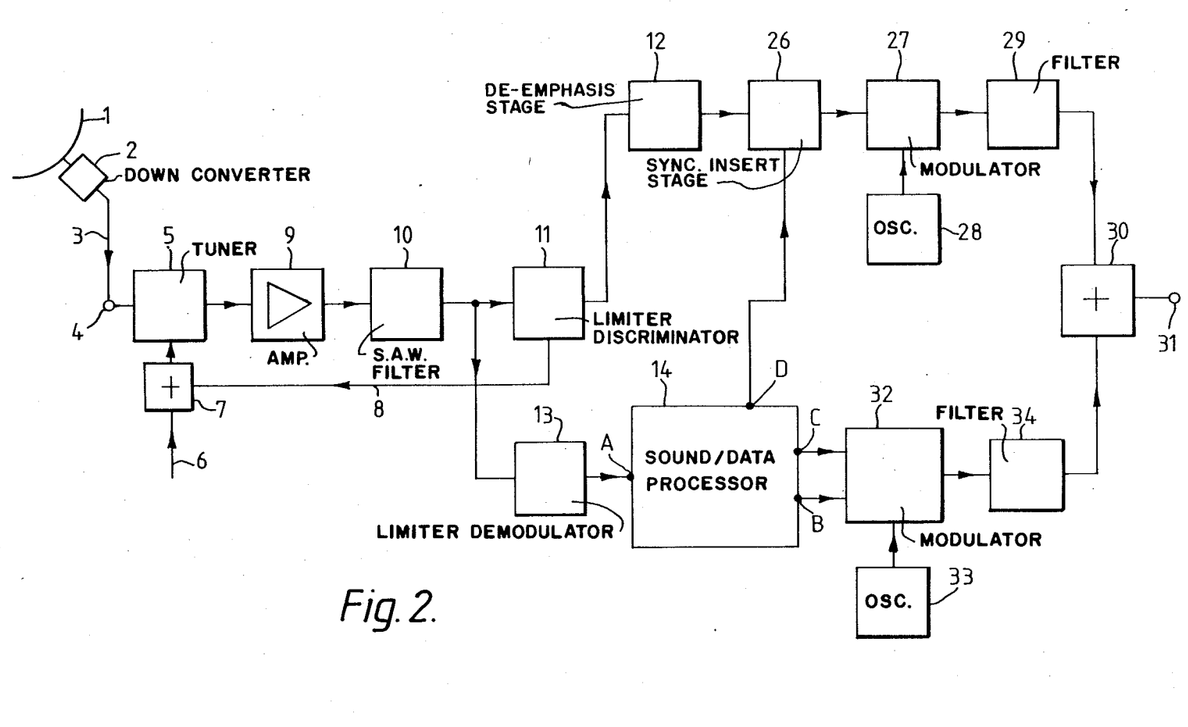
FIG. 2 is a block diagram of a conversion unit for use with the present invention.

The diagram of FIG. 2 includes a conversion unit for use with the present invention for converting a received C-MAC DBS television signal into one suitable for applying a MAC television signal to a cable distribution system. This Figure shows a dish aerial 1 of appropriate dimensions for receiving DBS television signals which are located in the 12 GHz broadcasting band. Attached to the aerial 1 is a down converter unit 2 in which the frequencies of the incoming signals are shifted such that they are positioned just above the UHF broadcasting bands and lie between 950 and 1750 MHz, so that they can be readily applied via a co-axial cable 3 to an input terminal 4 of the conversion unit. In the conversion unit, the signals at terminal 4 are applied to a tuner unit 5 where the desired television signal is selected in the usual manner by mixing it with a tuned local oscillator signal to produce an intermediate frequency (i.f.) signal which, in this case, has a frequency of 134 MHz. The bandwidth of the tuner 5 and the resulting i.f. signal is 27 MHz to match the bandwith of the DBS signal. Tuning of the tuner unit 5 is effected by means of a selection voltage applied over a connection 6 from a selector unit (not shown) applied by way of a first input of an adder circuit 7 whose output is connected to the appropriate input of the tuner unit 5. The adder circuit 7 has a second input to which an automatic frequency control (a.f.c.) voltage is applied over a connection 8, this a.f.c. voltage being added to the selection voltage to ensure correct tuning of the tuner unit 5. The i.f. signal from the tuner unit 5 is amplified in an amplifier stage 9 and applied to surface accoustic wave (S.A.W.) filter 10 having a pass band of 27 MHz centered on the i.f. of 134 MHz. The output of the SAW filter 10 is applied to a limiter and discriminator stage 11 in which the frequency modulated chrominance and luminance vision components of the i.f. signal are demodulated to produce at its output a baseband vision MAC signal which is subjected to de-emphasis in a de-emphasis stage 12. The limiter and discriminator stage 11 also produces the a.f.c. voltage which is applied over connection 8 to adder circuit 7.

Figure 3:
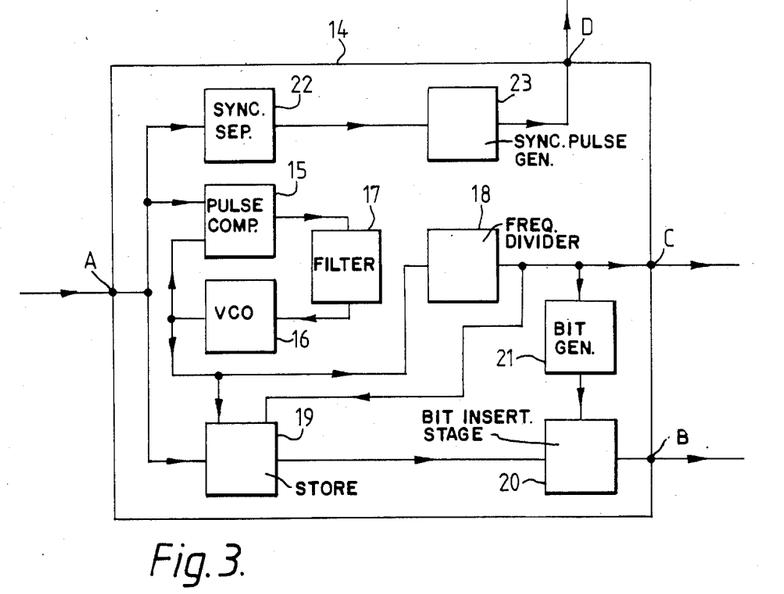
FIG. 3 is a block diagram of part of FIG. 2 in greater detail.

The i.f. signal is also applied to a limiter and 2-4 PSK demodulator stage 13 in which the sound/data component (194 bits at 20.25M bit/s) is recovered. This sound/data component, in the form of bursts at 20.25M bit/s, is applied to a sound/data processor 14 which has a number of functions, one of which is to expand the sound/data component such that it has a much lower bit rate. Certain features of the processor 14 are shown in greater detail in FIG. 3. In FIG. 3 the bursts of the 20.25M bit/s sound/data component are applied to the input A of the processor 14 from where they are applied as a first input to a phase comparator 15 a second input of which receives oscillations at the clocking frequency of 20.25 MHz from a voltage-controlled crystal oscillator 16. The comparator 15 produces a voltage at its output depending on the phase relationship between its two inputs, which voltage is applied through a low pass filter 17 to a control input of the oscillator 16 thus providing the voltage control for this oscillator. The output of the oscillator 16 is applied to a frequency divider 18, which divides the output of the oscillator 16 by six to produce a second clocking frequency of 3.375 MHz. The burst at input 15 is also applied to a digital store 19, which may be in the form of a shift register, the burst of the sound/data component appearing during each line of the C-MAC signal being written in the store 19 at the clocking frequency of 20.25 MHz under the control of the oscillator 16. In order to enable this sound/data component to be successfully conveyed over a cable distribution system, this component has to be expanded such that its bit rate is much lower than that present in the C-MAC signal. Conveniently, this component could be expanded to occupy a period of 64 μs which corresponds to the line period in a 625 lines per-frame, 25 frames-per-second television system and this would mean that the bit rate for the 194 bits of the sound/data component would need to be 3.0625M bit/s. Such a bit rate would be difficult to realize from the incoming bit rate and, in addition, it would be difficult to regenerate the original clocking frequency of 20.25 MHz from data at 3.0625M bit/s. In the processor 14 therefore the sound/data component is read out during a period which is less than 64 μs at a bit rate which is higher than 3.0625M bit/sec and which, at the same time, is an integral sub-multiple of the original bit rate of 20.25M bit/s (in this case one-sixth of the original bit rate). The sound/data component is therefore read out under the control of the second clocking frequency of 3.375 MHz during each 64 μs period to occupy 194 bits of the 216 bits at that rate during such a period and is applied to a gated bit insertion stage 20. A second input of stage 20 is connected to the output of a bit generator 21 whose input receives the second clocking frequency of 3.375 MHz, which generator 21 produces bits in a predetermined pattern (and could be used to carry additional information) which are added during the remaining 22 bits of each 64 μs period by the gated bit insertion stage 20 to produce an extended sound/data component during each 64 μs (line) period which is present at output B of processor 14 while an output C carries the second clocking frequency of 3.375 MHz. The burst at input 15 is also applied to a sync. separator circuit 22 which recognises the synchronizing information contained in the sound/data component and produces an output in response to this information, which output is applied to a sync. pulse generator 23 to produce a pseudo sync. pulse which is present at an output D of the converter unit 14, the purpose of which will be described later.

Figure 4:
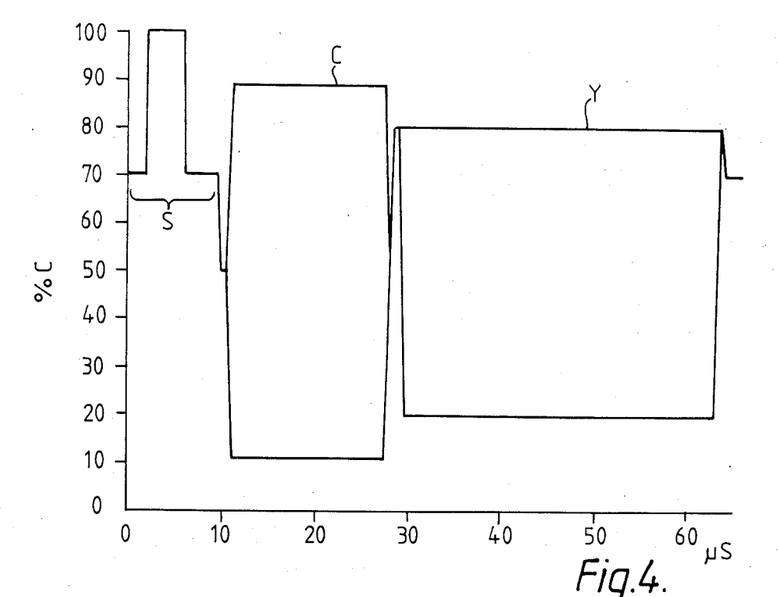
FIG. 4 is a plot of a vision signal for use with the present invention.

The vision signal from the de-emphasis stage 12 is applied to a first input of a gated sync, insertion stage 26 whose second input receives the pseudo sync. pulse from the output D of the processor 14, this sync. pulse being gated into the vision signal during the period previously occupied by the 194 sound/data bits (approx. 9.58 μs). The combined sync. and vision signal from the gated sync. insertion stage 26 is applied to the modulation input of a modulator 27 in which this signal is amplitude modulated onto a vision carrier received at a second input from a first carrier oscillator 28, the frequency of the carrier being in the frequency bands used for cable distribution systems. The nature of this signal during a line period (64 μs) against its percentage depth of modulation of the carrier (% C) is shown in FIG. 4 from which it will be seen that the pseudo sync. pulse together with its associated back and front porches (S) occupy the period previously occupied by the sound/data component while the compressed chrominance (C) and luminance (Y) components still occupy the same periods as in the C-MAC signal. It will therefore be appreciated that any scrambling or coding of these components in the received C-MAC signal is unchanged by the processing of these components in the processor 14 and remains intact. From FIG. 4 it will be seen that the pseudo sync. pulse is represented by 100% modulation of the carrier while the front and back porches are represented by 70% of carrier modulation. The zero-level of chrominance is represented by 50% of carrier modulations while the extremes of the chrominance component are represented by 89% and 11% of carrier modulation. In the luminance component, the black and white levels are respectively represented by 80% and 20% of carrier modulation. The ranges of the modulation for the chominance and luminance components retains the the 1.3 to 1 relationship between the maximum peak-to-peak amplitudes for these two components. The output from the modulator 27 is applied to a vestigial side band filter 29 to remove substantially all of the lower sideband of the amplitude modulated carrier from the modulator 27. The output from the filter 29 is applied to the first input of an adder circuit 30 whose output is connected to the output 31 of the conversion unit for application to a cable distribution system.

The outputs B and C respectively conveying the extended sound/data component and the second clocking frequency (3.375 MHz), are applied to a digital modulator 32 which, at a further input, receives the sound carrier from a second carrier oscillator 33, whose frequency is above that of the first carrier oscillator 28, in which the sound carrier is digitally modulated by the extended sound/data component, for example using quadrature phase shift keying. The modulated sound carrier output is applied through a bandpass filter 34 to a second input of the adding circuit 30 for application to the output terminal 31.

Figure 5:
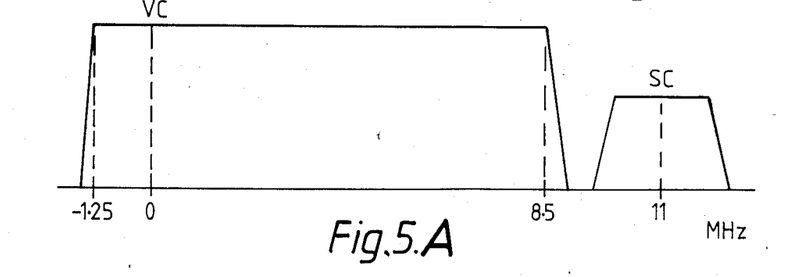
FIGS. 5A, 5B and 5C are plots of frequency characteristics for the second television signal of the present invention.

The frequency spectrum for the signal appearing at terminal 31 is shown in FIG. 5A where the vision carrier is indicated at VC and the spectrum of the vestigial sideband vision signal extends from approximately 1.25 MHz below the vision carrier to approximately 8.5 MHz above the vision carrier. The sound carrier indicated by SC is located 11 MHz above the vision carrier VC and the extended sound/data component modulation extends approximately 3 MHz about the sound carrier. It will be seen from FIG. 5 that the modulated sound bandwidth lies outside the modulated vision bandwidth while the bandwidth occupied by the modulated vision and sound components together is approximately 14 MHz which is substantially half the 27 MHz bandwidth of the DBS C-MAC signal.

Figures 5B, 7B:
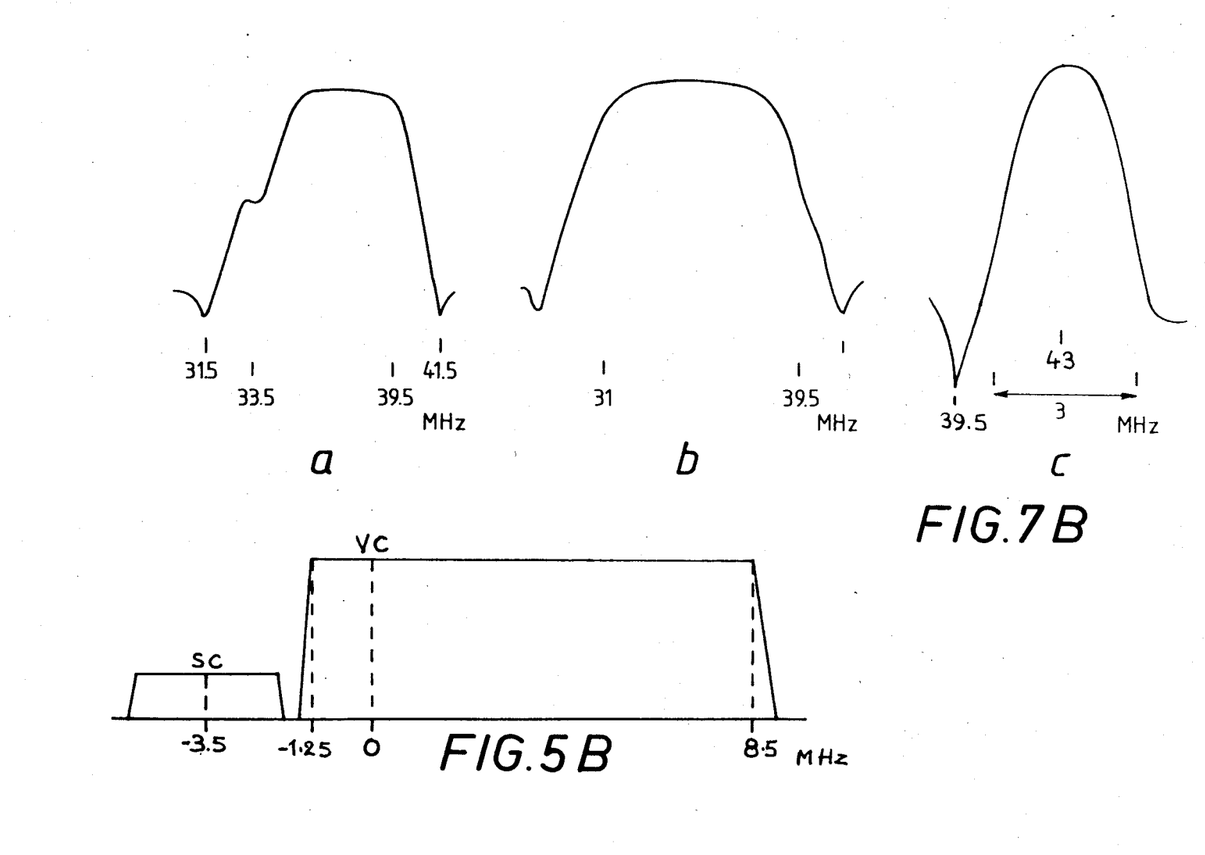
FIGS. 7A, 7B and 7C are bandpass characteristics for filters used in the receiver of FIG. 6.
Figure 5C:
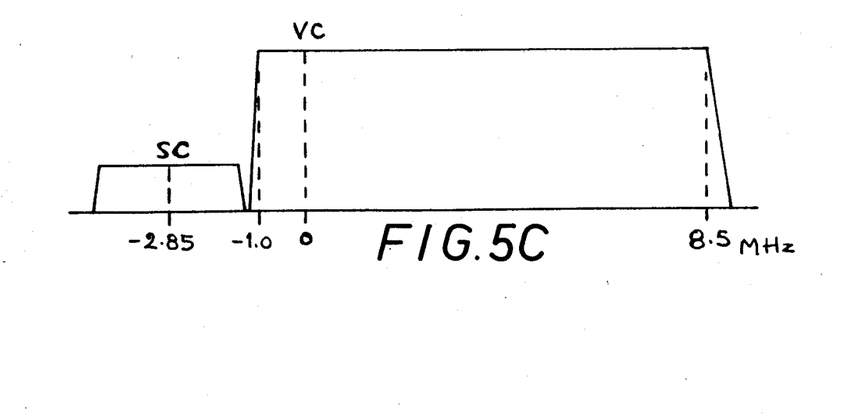

Instead of positioning the frequency of the second carrier oscillator 33 above that of the first carrier oscillator 28, it may lie below that of the first carrier oscillator, i.e. on the vestigial sideband side of the modulated first carrier. The frequency spectrum for the signal appearing at terminal 31 suitable for use with two adjacent cable television channels for the U.K. (8 MHz per channel) in such a case is shown in FIG. 5B where the vision carrier is indicated at VC and the spectrum of the vestigial sideband vision signal extends from approximately 1.25 MHz below the vision carrier to approximately 8.5 MHz above the vision carrier. The sound carrier indicated by SC is located 3.5 MHz below the vision carrier VC and the extended sound/data component modulation extends approximately 3 MHz about the sound carrier. With some types of digital modulation the second carrier frequency may not be located at the center of the sound/data component spectrum. FIG. 5C shows the corresponding frequency spectrum suitable for use with two adjacent cable television channels for Europe (7 MHz per channel) and is similar to FIG. 5B except that the vestigial sideband vision signal extends from approximately 1 MHz below the vision carrier whilst the sound carrier SC is located 2.85 MHz below the vision carrier VC. In both the U.K. and European cases, the maximum amplitude of the sound-/data signal may be of the order of −20 dB relative to the vision carrier. It will be seen from FIGS. 5B and 5C that the modulated sound bandwidth also lies outside the modulated vision bandwidth while the bandwidth occupied by the modulated vision and sound components together is approximately 14 MHz which is substantially half the 27 MHz bandwidth of the DBS C-MAC signal.

The processor 14 described with reference to FIG. 3 may also be used, with some modification, in a television receiver intended to receive the C-MAC DBS television signal directly from a satellite. In such a case the sync. pulse generator 23 would not be required and the sync. separator circuit 22 would supply the sync. information for the receiver. The receiver itself would be similar to the conversion unit of FIG. 2 up to the de-emphasis stage 12 and the processor 14. The output of the de-emphasis stage 12 would then be connected to the necessary circuitry for demodulating the vision components while the outputs B and C of processor 14 would be connected to the necessary circuitry for demodulating the sound/data components. Such vision and sound/data circuitry is included in FIG. 6. The reduction of the bit rate for the sound/data components in such a receiver would simplify the operation of the associated demodulation circuitry.

Figure 6:
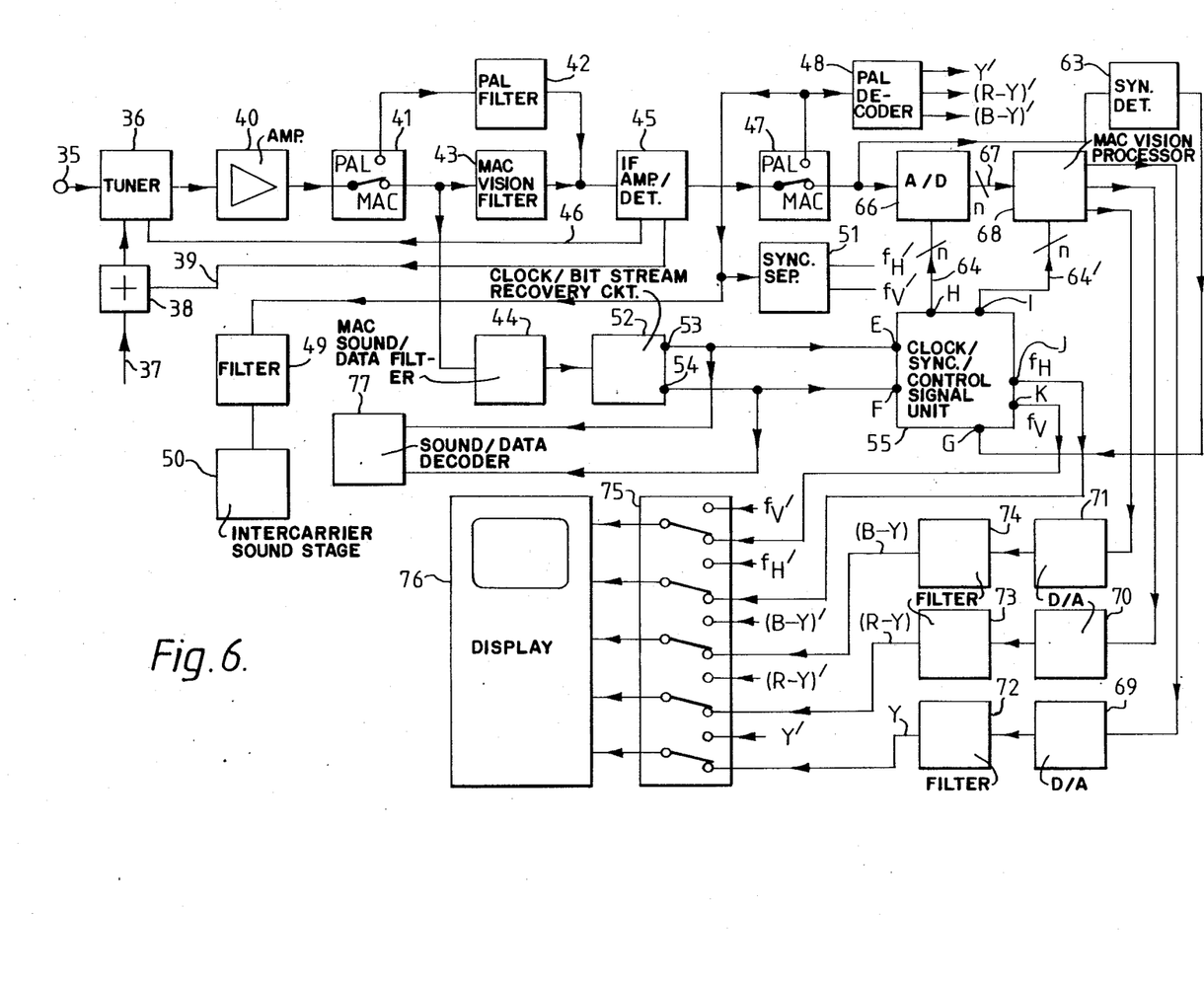
FIG. 6 is a block diagram of a television receiver for use with the present invention.
Figure 7A:
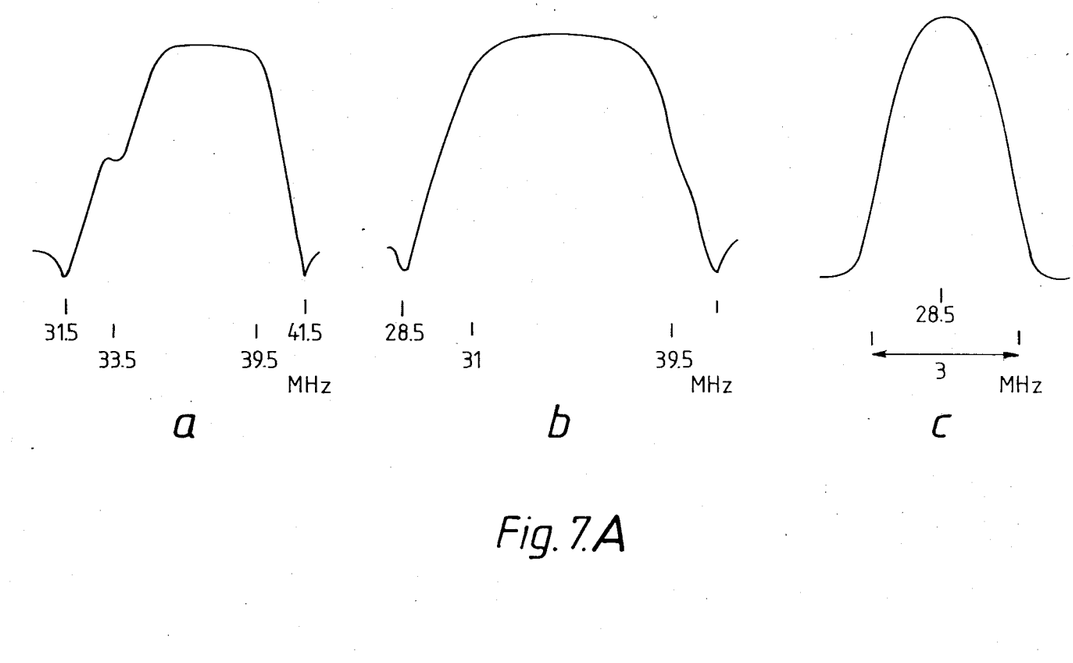
Figure 7C:
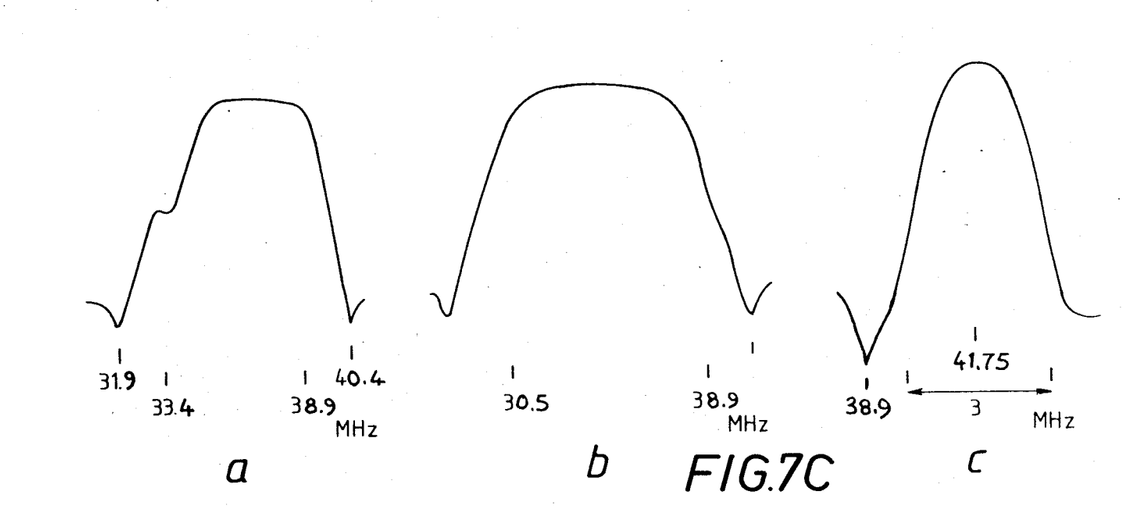

FIG. 6 is a block diagram of a television receiver capable of receiving television signals from a cable distribution system whether the signals be in one of the forms described above or according to the U.K. or European PAL-I standards i.e. PAL-I or PAL-B/G. The receiver comprises an input terminal 35 for connection to the cable system which is connected to a tuner unit 36 capable of covering the VHF and UHF frequency bands (40 to 860 MHz), the tuner unit having a received signal bandwidth of approximately 15 MHz. The tuner unit 36 has a local oscillator tuned by means of a control voltage applied over a connection 37 and an adder circuit 38 in a similar manner to the tuner unit 5 in FIG. 2, an a.f.c. signal being applied from a connector 39 to a second input of the adder circuit 38. The nature of the i.f. signal from the tuner unit 36 will depend upon the signal being processed though for either type of signal the vision carrier i.f. will be located at the same frequency e.g. 39.5 MHz where the receiver also receives PAL-I or 38.9 MHz where it also receives PAL-B/G. For the PAL-I signal the i.f. of the sound carrier will then be located at 33.5 MHz while that for the MAC signal will be located at 28.5 MHz if the sound carrier SC is located above the vision carrier VC (FIG. 5A) and 43 MHz if the sound carrier SC is located below the vision carrier VC (FIG. 5B). For the PAL-B/G signal, the i.f. of the sound carrier will be located at 33.4 MHz while that for the MAC signal will be located at 37.9 MHz if the sound carrier SC is located above the vision carrier VC (FIG. 5A) and 41.75 MHz if the sound carrier SC is located below the vision carrier VC (FIG. 5C). The output of the turner unit 36 is amplified by an amplifier stage 40 whose amplified output is applied to a first systems switch 41 in which the incoming signal may be applied either to an upper (PAL) output or a lower (MAC) output. The PAL output is connected to a first (PAL) bandpass filter 42 having a bandpass characteristic of the form substantially as shown in FIG. 7A$a$ or 7B$a$ for PAL-I or FIG. 7C$a$ for PAL-B/G. The MAC output of switch 41 is connected to a second (MAC vision) bandpass filter 43 and to a third (MAC sound/data) bandpass filter 44. The bandpass characteristic of filter 43 for receivers which also receive the PAL-I signal is shown in FIG. 7A$b$ or 7B$b$ while that for receivers which also receive the PAL-B/G signal is shown in FIG. 7C$b$. The bandpass characteristic of filter 44 for receivers which also receives the PAL-I signal is shown in FIG. 7A$c$ for the case where the sound carrier SC is located above the vision carrier VC (FIG. 5A) and in FIG. 7B$c$ for the case where this sound carrier is located below the vision carrier (FIG. 5B). Where the receiver also receives a PAL-B/G signal and the sound carrier is below the vision carrier (FIG. 5C) then the bandpass characteristic for filter 44 will be as shown in FIG. 7C$c$. The bandpass filters 42, 43 and 44 may conveniently by surface accoustic wave filters. The outputs of the first and second filters 42 and 43 are connected to the input of i.f. amplifier and detector stage 45 which may conveniently incorporate the Philips integrated circuit TDA 3540 or TDA 3541 (the type chosen being dependent on the tuner circuit 36) and for which Development Sample Data has been issued. Besides the amplifying and detection functions of this integrated circuit, it also produces the a.f.c. voltage which it applies to connection 39 and an automatic gain control (a.g.c.) voltage for the tuner unit 36 which is applied thereto over a connection 46, the production of this a.g.c. voltage being one reason why the pseudo sync. pulse is introduced into the vision signal (MAC) at the gated sync. insertion stage 26 of the conversion unit of FIG. 2 (the PAL-I signal already contains a corresponding sync. signal).

The detected output from the stage 45 is applied to a second systems switch 47 being similar to and operated simultaneously with switch 41. The upper (PAL) output of switch 47 is applied to a PAL signal decoder circuit generally depicted by the block 48 where the luminance and chrominance subcarrier components are used (when set for PAL operation) to produce the luminance Y' and the red (R-Y)' and blue (B-Y)' color difference signals. It is considered that the construction and operation of a PAL signal decoder is so well known as to not warrant a detailed description of its construction and operation.

The PAL output of the switch 47 is also connected to a further bandpass filter 49 having a passband at 6 MHz (PAL-I) or 5.5 MHz (PAL-B/G) to select the intercarrier frequency modulated sound signal when a PAL signal is present, this signal being further processed and demodulated in an intercarrier sound stage 50 to produce the demodulated sound signal at its output for application to a loudspeaker (not shown). A sync. separator stage 51 is also connected to the PAL output of switch 47 which in the presence of a PAL signal produces line $f_H'$ and field $f_V'$ sync. pulses from this signal.

Figure 8:
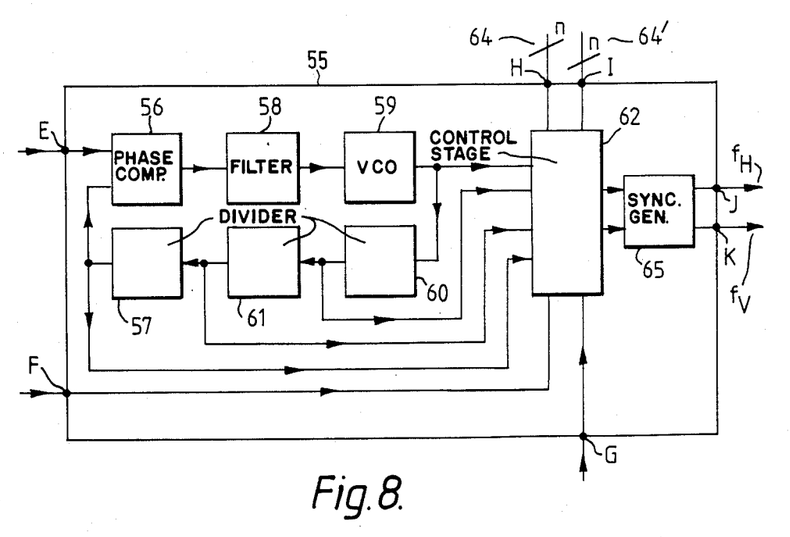
FIG. 8 is a block diagram of part of FIG. 6 in greater detail.

The output of the third bandpass filter 44 is connected to stage 52 which with a MAC signal present, recovers from the sound carrier i.f. the second clock frequency of 3.375 MHz at an output 53 and the continuous sound/data bit stream at 3.375M bit/s at an output 54. These outputs are applied to respective inputs E and F of a unit 55 which produces clocking signals, syn. signals and control signals for the further processing of the MAC signal. The unit 55 is shown in greater detail in FIG. 8 where it will be seen that the 3.375 MHz clocking frequency input E is connected to a first input a phase comparator 56, a second input of which receives a signal at this clocking frequency of 3.375 MHz from a divider circuit 57 which divides a signal applied thereto by 2. The output of the comparator 56 is a voltage dependent on the phase relationship between its two inputs, this voltage being applied through a low-pass filter 58 to a control input of a voltage-controlled crystal oscillator 59 of frequency 20.25 MHz. The output of oscillator 59 is successively connected, through a divider stage 60 which divides by 3/2, and a further divider stage 61 which divides by 2, to the input of divider stage 57. The divider stages 60, 61 and 57 respectively produces outputs at 13.5 MHz, 6.75 MHz and 3.375 MHz which, together with the output of oscillator 59, are applied to a control stage 62 to which the input at terminal F is also applied. A further input of the control stage 62 also receives the pseudo syn. pulse present at an input G. This pseudo syn. pulse present in the MAC vision signal is separated from the signal present at the MAC output of switch 47 by a pseudo sync. detector 63 whose output is connected to the input G (FIG. 6). The control stage 62 produces timing signals necessary for the processing of the MAC vision signal and which appear at outputs H and I of unit 55 for application to multi-lead connections 64 and 64' and include the appropriate clocking frequencies. Outputs of the control stage 62 are also applied to a sync. generator 65 which from these inputs produce line ($f_H$) and field ($f_V$) sync. signals which are applied to output terminals J and K of the unit 55.

The MAC output of the switch 47 is connected to an analog-to-digital converter 66 which also receives control and 20.25 MHz clock signals from unit 55 over the connection 64. The time sequential vision signal is converted to digital form in the converter 66, the parallel bits of which are conveyed over multi-lead connection 67 to a MAC vision processor 68 where the chrominance and luminance components are separately stored and expanded in known manner under the control of the control signals and clock signals present in connection 64'. The processor 68 has three outputs which are connected as shown to respective digital-to-analog converters 69, 70 and 71 and low-pass filters 72, 73 and 74 to produce respective luminance (Y) and red (R-Y) and blue (B-Y) color difference signals.

The Y, R-Y and B-Y signals from a processed MAC signal and the Y', (R-Y)' and (B-Y)' signals from a processed PAL signal are applied to respective inputs of a further multi-pole systems switch 75 to which the sync. signals $f_H$, $f_V$ and $f_H'$, $f_V'$ are also applied, the switch 75 being operated simultaneously with switches 40 and 47. Switch 75 applies the appropriate signals, depending on the type of signal received, to a display unit 76 where these signals are further processed in known manner to produce a television display.

The clocking frequency 53 and sound/data 54 outputs of stage 52 are also applied to a sound/data decoder 77 which separates and de-multiplexes the sound and data signals. The decoder 65 is not shown in greater detail as its construction depends on the composition of the sound/data component. The sound signals from the decoder 77 will be applied to a loudspeaker through a further systems switch (also not shown) which operates simultaneously with switches 41, 47 and 75.

From FIG. 6 it will be seen that the dual standard receiver utilizes a number of common stages no matter which of the signals is being received. While reference has been made to one of the signals being of the PAL standard, it could be any form of frequency multiplexed color television signal.

We claim:

1. A television transmission system in which a first time multiplexed television signal having a given bandwidth is converted into a second television signal for transmission via a media with a bandwidth which is restricted with respect to that of the first television signal, in which discrete lines of said first television signal sequentially contain a digital sound/data component, a time compressed chrominance component and a time compressed luminance compound, said sound/data component modulating a carrier at a first bit rate while said carrier is frequency modulated by said chrominance and luminance components, characterized in that said second television signal comprises a first carrier amplitude modulated by a video signal, discrete lines of which sequentially contain the time compressed chrominance component and the time compressed luminance component at corresponding compression rates and located in corresponding positions as with said first television signal, said second television signal further comprising a second carrier located outside the modulation bandwidth of said first carrier, which second carrier is modulated by the digital sound/data component present in the discrete lines of said first television signal but expanded to occupy a major part of each discrete period, said second bit rate being an integral sub-multiple of said first bit rate, the second bit rate being greater than $f_1 \times (n/m)$ where $f_1$ is the first bit rate, n is the number of bits in the compressed sound/data component in said first television signal and m is the number of bits in a line period at said first bit rate; and at least one receiver comprising selection means for selecting one of a plurality of transmission channels of a restricted bandwidth which carries said second television signal, a first signal processing arrangement connected to said selection means for processing the video signal conveyed by said first carrier, said receiver including a second processing arrangement for processing the sound/data information conveyed by said second carrier, said second processing arrangement having means for recovering a clocking signal corresponding to that of the first bit rate present in said first television signal from the second bit rate present in said second television signal.

2. A system as claimed in claim 1, characterized in that the modulation of the first carrier by the video signal is vestigial sideband amplitude modulation.

3. A system as claimed in claim 2, characterized in that the second carrier is located on the vestigial side of said modulated first carrier.

4. A system as claimed in claim 1, 2, or 3 characterized in that a pulse signal is additionally present in each line of the vision signal of said second television signal, which pulse signal is located within the position corresponding to that of the data/sound component in said first television signal.

5. A conversion unit for use with the television system as claimed in claim 1, comprising means for receiving said first television signal, discrete lines of which sequentially contain a digital sound/data component, a time compressed chrominance component and a time compressed luminance component, said digital sound/data component modulating a carrier at a first bit rate while the carrier is frequency modulated by said compressed chrominance and luminance components, means for frequency demodulating said modulated carrier to produce said compressed chrominance and luminance components and means for recovering the digital sound/data component from said modulated carrier, characterized in that said conversion unit additionally comprises means for amplitude modulating the demodulated compressed chrominance and luminance components onto a first carrier in such manner that the compression rates and positions of said components correspond to those in said first television signal, means for expanding the recovered sound/data component at a second bit rate such that the recovered component from each line of said first television signal occupies a major part of a discrete period which corresponds to the period of a television line, the second bit rate being an integral sub-multiple of the first bit rate which second bit rate is greater than $f_1 \times (n/m)$ where $f_1$ is the first bit rate, n is the number of bits in the sound/data component in said first television signal and m is the number of bits in a line period at the first bit rate, and means for modulating the expanded sound/data component on a second carrier located outside the modulation bandwidth of the first carrier, the first and second modulated carriers forming the second television signal.

6. A conversion unit as claimed in claim 5, characterized in that said unit additionally comprises a vestigial sideband filter such that said first carrier is vestigial sideband amplitude modulated by said compressed chrominance and luminance components.

7. A conversion unit as claimed in claim 6, characterized in that said unit additionally comprises means for positioning said second carrier on the vestigial side of said first carrier.

8. A conversion unit as claimed in claim 5, 6 or 7, characterized in that said unit further comprises means for generating a pulse signal at line rate, and means for adding said pulse signal to the vision signal of said second television signal in such manner that said pulse signal is located within the position corresponding to that of the sound/data component in said first television signal.

9. A conversion unit as claimed claim 5, 6, or 7, characterized in that said conversion unit additionally comprises means for adding digital components to said expanded digital sound/data component during a minor part of each discrete period.

10. A conversion unit as claimed in claim 9, characterized in that said conversion unit further comprises means for modulating said added digital components with sound/data information.

11. A receiver as claimed in claim 1, wherein a pulse is additionally present in each line of the vision signal of said second television signal, which pulse signal is located within the position corresponding to that of the sound/data component in said first television signal, characterized in that said receiver additionally comprises means for producing timing signals for the processing of the chrominance and luminance components present in said video signal which timing signals are produced from information contained in said sound/data component, means for recovering the pulse signal and means for applying said recovered pulse signal to said processing means to ensure a given time relationship between said pulse signal and said timing signals.

12. A receiver as claimed in claim 11 in which said selecting means is subjected to automatic gain control, characterized in that said automatic gain control is derived from the pulse signal present in the video signal.

13. A receiver as claimed in claim 1, 11 or 12, charactrized in that said receiver is a dual standard receiver capable of receiving said second television signal or a frequency multiplexed television signal.

14. A receiver as claimed in claim 13, in which the signal of either standard is applied to the same intermediate frequency amplifier and the same demodulating arrangement, characterized in the switchable filters are provided for operation with said amplifier to produce the required bandwidth characteristic for the signal of the appropriate standard.

* * * * *

UNITED STATES PATENT AND TRADEMARK OFFICE
CERTIFICATE OF CORRECTION

PATENT NO. : 4.665.427
DATED : May 12. 1987
INVENTOR(S) : John C. Beckley, et al It is certified that error appears in the above-identified patent and that said Letters Patent is hereby corrected as shown below:

IN THE CLAIMS

Claim 1, line 9    delete "compound" insert --component--

Claim 14, line 4   delete "the" insert --that--

Signed and Sealed this

Twenty-ninth Day of November, 1988

Attest:

DONALD J. QUIGG

*Attesting Officer*    *Commissioner of Patents and Trademarks*